United States Patent [19]

Galluzzi et al.

[11] 3,922,354

[45] Nov. 25, 1975

[54] PRODUCTION OF ARTIFICIAL SPICE PARTICLES

[75] Inventors: John F. Galluzzi, Boonton; Albert V. Saldarini, Nutley; Thomas E. Murray, Rockaway Township, all of N.J.

[73] Assignee: Norda Incorporated, New York, N.Y.

[22] Filed: Aug. 20, 1973

[21] Appl. No.: 389,500

[52] U.S. Cl. ................. 426/96; 426/578; 426/651
[51] Int. Cl.² ............................................ A23L 1/22
[58] Field of Search ............ 426/96, 167, 137, 221, 426/222, 223, 208, 229, 350, 65, 98, 103

[56] References Cited
UNITED STATES PATENTS

| | | | |
|---|---|---|---|
| 3,326,696 | 6/1967 | Decnop et al. | 426/167 |
| 3,615,597 | 10/1971 | Durst et al. | 426/221 X |
| 3,615,645 | 10/1971 | Forkner | 426/167 X |
| 3,704,137 | 11/1972 | Beck | 426/222 |
| 3,819,838 | 6/1974 | Smith et al. | 426/223 X |

*Primary Examiner*—A. Louis Monacell
*Assistant Examiner*—Esther L. Massung
*Attorney, Agent, or Firm*—Burns, Doane, Swecker & Mathis

[57] ABSTRACT

Improved particulate free-flowing flavoring compositions are provided utilizing flavoring agents in a cellular matrix of gelatinized cereal solids and water. Dextrins, mixtures of edible mono and diglycerides of higher fatty acids, and coloring agents can also be added to the matrix to provide a free flowing product which exhibits controlled flavor release characteristics, the aesthetic appeal of natural whole or ground spices (with none of the attendant hazards), and precisely controlled flavor values and strength.

38 Claims, 1 Drawing Figure

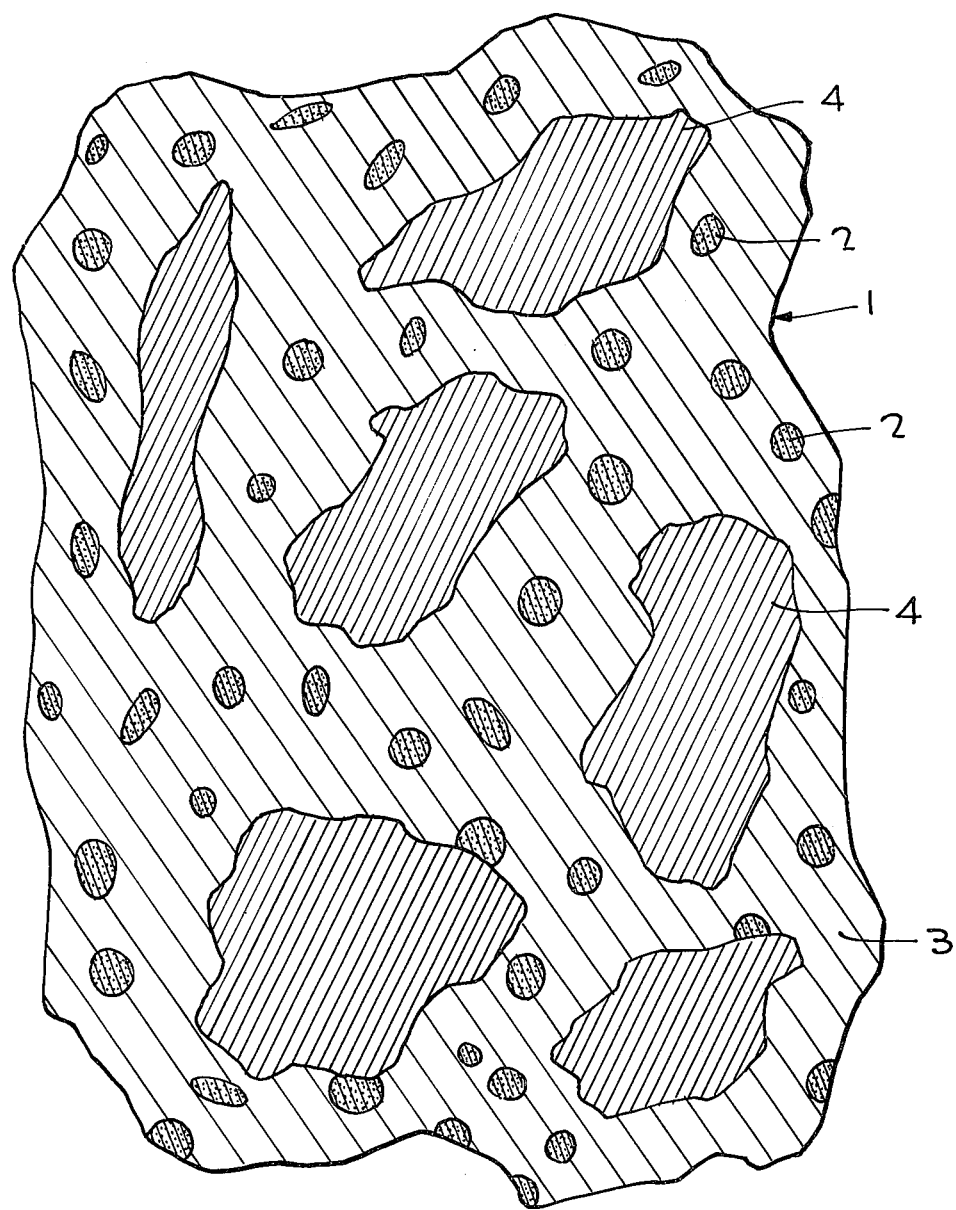

PRODUCTION OF ARTIFICIAL SPICE PARTICLES

BACKGROUND OF THE INVENTION

It is well known that natural spices are subject to many types of contamination such as mold, insect filth, rodent hairs, excrement, etc. See, for instance, the Wall Street Journal, article of Jan. 5, 1972, "Does Your Paprika Get Up Off the Plate and Just Walk Away?" by Mary Bralove.

In the American Spice Trade Association newsletter of Sept. 7, 1972, there is reported the results of a microbiological study of 10 widely used spices. This report indicates the high degree of microbioal contamination in whole spices in general. In particular, the standard plate counts for 12 samples (from seven different sources) of black pepper that were tested, all exceed one million bacteria per gram of spice. All of these black pepper samples contained mold and yeast.

Thus, natural whole and ground spices have a high bacteria count and do not lend themselves to facile decontamination. In fact, it is virtually impossible to eliminate the foreign bodies from natural spices.

Oleoresins and essential (volatile) oils have been proposed to eliminate the above-mentioned contaminants. In the past, these oils and oleoresins have been "plated" (i.e., physically mixed on a powdered carrier such as dextrose), "spray dried" in water soluble carriers such as gum acacia and dextrins, or absorbed in a flavor carrier.

However, prior art synthetic spices have not satisfactorily fulfilled their intended purpose of spice replacement for one or more of the following reasons: (1) lack of aesthetic appeal either of the spice particle itself or of the spice particle in the consumer food product, (2) lack of reproduction of the full flavor of natural spices, (3) flavor loss especially during cooking or baking procedures, and (4) poor color rendition.

For example, prior art processes heretofore used to prepare flavoring compositions are indicated in U.S. Pat. No. 2,258,567 to Epstein et al, U.S. Pat. No. 2,919,989 to Schultz, U.S. Pat. No. 3,041,180 to Swisher, and U.S. Pat. No. 3,644,127 to Moores et al. However, these prior art processes result in spice particles which lack the desired visual appeal in the consumer product, lack the full flavor of natural whole and ground spices, and/or lack the ability to retain flavor during cooking or baking procedures.

Specifically, U.S. Pat. No. 3,041,180 provides a process for preparing an essential oil solid emulsion by admixing with corn syrup solids either glycerol or a nontoxic glycol (or mixtures thereof) and heating this mixture sufficiently high to form a syrup, adding an emulsifying agent and an essential oil, emulsifying the resulting composition by agitation, forming a solid emulsion therefrom, and subdividing the solid emulsion into particulate form. The essential oil solid emulsion thus formed is essentially water redispersible and such a particle would lose its visual identity as a discrete visible particle in the consumer product. Such a particle does not exhibit precise flavor control and release. The solid emulsion of U.S. Pat. No. 3,041,180 is also hygroscopic. Such a composition must be kept in tightly closed containers since the particles of such a composition tend to become less free-flowing with time.

Other prior art processes, such as that disclosed in U.S. Pat. No. 2,449,411 to Rapaport, produce substantially insoluble spice particles by heating cereal flour to a temperature at which the natural sugars of the flour become caramelized. Such particles do not exhibit precise flavor control and release, however. These particles also do not exhibit the variegated colors necessary to truly recreate the actual appearance of a number of ground spices.

Accordingly, it is an object of the present invention to provide synthetic spice particles having controlled flavor release characteristics.

It is a further object of this invention to provide synthetic spice particles which have the aesthetic appeal of natural whole or ground spices.

It is another object of this invention to provide synthetic spice particles in which the loss of volatiles is minimized during cooking or baking.

A further object of this invention is to provide synthetic spice particles which retain the aesthetic appeal of natural whole or ground spices in the consumer food product.

Still another object of this invention is to provide synthetic spice particles with precisely controlled flavor values and strength.

Yet another object of this invention is to provide synthetic spice particles which are non-hygroscopic (i.e., free flowing) and which are capable of undergoing storage for an extended period of time without deleterious results.

Still another object of this invention is to provide synthetic spice particles which are sanitary, i.e., free of the attendent contamination hazards of natural whole or ground spices.

A further object of this invention is to provide an improved process for preparing synthetic spice particles.

These and other objects, as well as the scope, nature, and utilization of the invention, will be apparent from the following detailed description and appended claims.

SUMMARY OF THE INVENTION

It has been found that an improved particulate free-flowing flavoring composition having controlled flavor release characteristics comprises a flavoring agent incorporated in discrete cells substantially throughout a gelatinized cellular matrix comprising gelatinized cereal solids and water.

It has been found that a process for preparing an improved free-flowing flavoring composition having controlled flavor release characteristics comprises:

a. forming a mixture of gelatinized cereal solids in water, b. heating this mixture with agitation to a temperature of from about 65 to about 100°C until gelation takes place and a water content of from about 10 to about 20 per cent by weight is achieved, c. cooling the mixture to a temperature of from about 40° to about 60°C., d. dispersing at least one flavoring agent into the cooled mixture while at a temperature of from about 40° to about 60°C., e. cooling the resulting mixture until hardening occurs, and f. grinding the hardened mixture to desired particle size.

Alternatively, before hardening, the mass can be extruded through apertures into a moulding starch. Here the filaments are hardened through cooling, cracked into short lengths, and then separated from the starch.

DESCRIPTION OF THE DRAWING

The drawing is a perspective view of the cross section of an artificial spice particle in accordance with the present invention. The spice particle in the drawing represents magnification of approximately 120 times that of the artificial spice particle of the present invention.

DESCRIPTION OF PREFERRED EMBODIMENTS

The improved particulate free-flowing flavoring compositions of the present invention are prepared by forming a mixture comprising 25 to 75 per cent by weight (preferably 30 to 70 per cent by weight) gelatinized cereal solids and 20 to 45 per cent by weight (preferably 25 to 40 per cent by weight) water, heating this mixture with agitation until gelation takes place, cooling the mixture, dispersing a flavoring agent throughout the cooled mixture, further cooling the resulting mixture until hardening occurs, and grinding the hardened mass to desired particle size.

The gelatinized cereal solids and water are mixed in any convenient manner until each component of the mixture is substantially distributed throughout the mixture. Such admixture may be conveniently conducted by use of a Hobart mixer or other similar high shear mixer. The resulting blend has the consistency of a viscous difficulty flowable mash.

The gelatinized cereal solid-water mixture initially is heated to a temperature of from about 65 to about 100°C until gelation takes place. (By gelation is meant the formation of a jelly-like, semisolid mixture). Such heating results in a water content in the mixture of 10 to 20 per cent by weight (preferably 12 to 18 per cent by weight).

The gelled mixture is then cooled to a temperature of 40° to 60°C. (preferably 45° to 55°C.) and a flavoring agent is dispersed throughout this cooled mixture by agitation. The flavoring agent can be dispersed in any convenient manner until the flavoring agent is substantially distributed throughout the mixture. Such admixture may be conveniently conducted by use of a Hobart mixer or other similar high shear mixer.

The product is then further cooled until hardening occurs. This mass is then ground. Alternatively, the unhardened mass can be extruded through a heated screw type extruder containing apertures of 1 to 6 millimeters (preferably 2 to 5 millimeters) diameter into a moulding starch. (Moulding starch is essentially a non-dusting form of dry starch which serves to prevent coherence of the individual extruded filaments.) Here the filaments are hardened through cooling and broken into lengths of from 1 to 6 millimeters (preferably from 2 to 5 millimeters). The filaments are then easily separated from the starch by a sifting operation prior to packaging.

The final spice-like product commonly has a moisture content of about 3 to 10 per cent by weight (preferably 4 to 8 per cent by weight).

The process of the present invention can be carried out at any pressure including subatmospheric and superatmospheric, but ambient pressures are preferred.

The cellular matrix of the present invention includes as a major component gelatinized cereal solids. In this specification, the phrase "gelatinized cereal solids" is used to mean cereal solids that are actually "pre-gelatinized" to a partially gelatinized state prior to admixture with water in the present process. Such a component is commercially available in a dry free-flowing state. For example, if the cereal solids used are derived from corn, then the gelatinized cereal solids may be prepared by passing raw corn grit remaining after the cereal solid has been degerminated in a dry mill process through hot rollers at elevated pressures. The resultant effect is a gelatinization of at least a substantial portion of the starch present and the simultaneous drying of the corn in a flaked form. The outer portion of these flakes consists of gelatinized cereal solids whereas the central portion consists mainly of insoluble farinaceous material. When the gelatinized cereal solids are heated in water, they exhibit binding characteristics but not complete solubility.

The outer portion of the dry gelatinized cereal solid when re-introduced into an aqueous system re-hydrates (i.e., absorbs water) to give a gelatin-like surface which serves as an excellent matrix for the incorporation of a flavoring agent (e.g., oleoresins and essential oils) or a combination of such agents. The inner portion of the gelatinized cereal solids remains insoluble in the aqueous system.

Any cereal solid that contains starch can be "pre-gelatinized" as described hereinabove. Thus, the term "gelatinized cereal solids" includes, inter alia, such starch-bearing cereals as wheat, rye, barley, corn, oats, and rice.

In this specification, the term "flavoring agent" includes liquid and/or solid forms of both natural and synthetic flavoring materials that preferably are substantially immiscible with water. Such materials include oleoresins, essential oils, synthetic flavoring materials, and intermixtures thereof.

Essential oils are plant kingdom products in which the odoriferous and flavoring characteristics are concentrated. Such products are also termed etherial and volatile oils in the literature in contradistinction to the mineral oils and fixed oils of animal or vegetable origin. Essential oils are usually liquids at room temperature. When diluted, the odor of an essential oil resembles that of the plant or part of the plant from which it was obtained. Essential oils are only slightly soluble in water but somewhat more soluble in sugar solutions.

All essential oils are mixtures and very often are complex mixtures. In general, the components comprising an essential oil can be placed into two principal categories: a hydrocarbon portion which is usually the major part of the essential oil and a portion consisting of many oxygenated components. The oxygenated components may be placed into the usual organic chemistry groups of acids, alcohols, esters, aldehydes, ketones, ethers, and polyfunctional compounds. The sulfur-bearing and nitrogen-bearing components may be also placed in the second group. Often they are present in trace amounts; nevertheless they exert a very powerful influence on the odor and flavor properties of the oil. A typical example of this is the ethyl ester of methyl-$\beta$-thiopropionic acid which is a component of pineapple juice present in trace amounts and yet has a great influence on the flavor.

In recent times, concomitant with the growth of the essential oil industry, essential oils instead of the spices themselves have been used for flavoring purposes. The essential oils useful in the present invention include allspice oil, cinnamon oil, caraway oil, nutmeg oil, oil celery, pepper oil, oil oreganum, oil onion, oil garlic, and oil basil. In short, any essential oil listed by the Food and Drug Administration as approved for use in foods can be used in the present invention.

An oleoresin is a mixture of a resin and an essential oil of the plant from which they are derived. Oleoresins have a peculiar odor and pungent taste and are sometimes referred to as balsams. In short, any oleoresin listed by the Food and Drug Administration as approved for use in foods can be used in the present invention.

Synthetic flavoring agents include any flavoring material that can be chemically prepared and which is approved by the Food and Drug Administration for use in foods. Such synthetic flavoring agents include, for example, isoamyl valerate or "apple essence". Isoamyl valerate is prepared by adding sulfuric acid to a mixture of amyl alcohol and valeric acid followed by recovery by distillation.

An example of a preferred combination of flavoring agents is "imitation pizza flavor" which is a mixture of oil oreganum, oil onion, oil garlic, and oil basil.

It is possible to prepare these artificial spice particles using only a mixture of gelatinized cereal solids and water and adding a flavoring agent such as described hereinabove. The part of the gelatinized cereal solid that has been pre-gelatinized acts as a binder for the flavoring agent and the flavoring agent itself in some instances provides color for the artificial spice. If the cellular matrix is prepared from only gelatinized cereal solids and water, then 25 to 75 percent by weight (preferably 30 to 70 percent by weight) of the gelatinized cereal solid-water mixture contains gelatinized cereal solids.

However, additives such as "modified" dextrins, mixtures of mono- and diglycerides, toasted cereal solids, and coloring agents increase the amount of control of flavor release, help control the rate of hydration, and increase the aesthetic appeal of the artificial spice particles.

Coloring agents may be added to the mixture of gelatinized cereal solids and water in order to give the final spice product the aesthetic appeal of natural whole or ground spices. In this specification, the term "coloring agent" is intended to embrace both natural and synthetic colorants. Natural colorants are intended to include cereal solids both untoasted and toasted (such as toasted defatted rice bran). Thus, coloring agents include chlorophyll, annato, caramel, beet color, cochineal, certified food colors and certified lakes.

Because of the tremendous range of tinctorial powers, it is difficult to specify a particular percentage of coloring agent that should be added. Generally, but not always, synthetic colorants have much greater tinctorial powers than natural colorants.

Thus, the concentration of coloring agent (or combination of coloring agents) used in the present invention varies over a wide range depending upon the effect desired. In the case of synthetic colors, a range of from about 0.01 per cent by weight to about 3 per cent by weight (e.g., 1 to 3 per cent by weight) is usual whereas with "lakes" or insoluble coloring agents (e.g., charcoal or toasted defatted rice bran) a concentration range of from about 4 per cent by weight to about 15 per cent by weight is preferred (based on the weight of the initial mixture).

In a particularly preferred embodiment of this invention, cereal products (i.e., non-gelatinized), both toasted and untoasted, are used as coloring agents. Such cereal products perform a dual role. They serve as a color additive as hereinabove stated, but they also serve to help control the rate of flavor release from the cellular matrix. For example, in order to simulate the multi-colored effect of ground pepper, toasted cereal products can be used in conjunction with a lighter base material such as untoasted cereal products. Cereal products include any cereal grain, flour or bran.

In a particularly preferred embodiment of the present invention, toasted defatted rice bran is employed as a coloring agent.

"Modified" dextrins have excellent film-forming and binding characteristics and when added to the mixture of gelatinized cereal solids and water of the present invention enable one to control the rate of hydration of the artificial spice particles. In the present specification, the term "hydration" is used to mean the sorption of water molecules by the spice particles.

Dextrin is an intermediate product formed by the hydrolysis of starches. In the present specification, the phrase "modified dextrins" is meant to include a low dextrose equivalent (i.e., dextrose equivalent of from about 9 to 12) carbohydrate produced by the hydrolysis of starch. This carbohydrate product has extremely rapid water solubility, low moisture absorption and little sweetness. Such "modified" dextrins are commercially available.

A typical embodiment of the present invention comprises admixing (a) gelatinized cereal solids which when heated in water have binding characteristics but not complete solubility, (b) modified dextrins which have excellent film-forming and binding characteristics and which are very soluble alone and help control the rate of hydration when combined in an artificial spice particle, (c) coloring agents such as toasted cereal solids, (d) water to dissolve the modified dextrin and to permit swelling of the gelatinized cereal solids, and (e) flavoring agent.

In this embodiment of the present invention, the artificial spice particle is prepared by processing as heretofore described 25 to 75 per cent by weight (preferably 30 to 70 per cent by weight) gelatinized cereal solids, 3 to 12 per cent by weight (preferably 5 to 10 per cent by weight) "modified" dextrins, 0 to 15 per cent by weight (preferably 1 to 3 per cent by weight) coloring agent, 20 to 45 per cent by weight (preferably 20 to 40 per cent by weight) water, and 0.2 to 16 per cent by weight (preferably 4 to 15 per cent by weight) flavoring agent.

Mixtures of edible mono- and diglycerides of higher fatty acids such as those mono- and diglycerides produced by the alcoholysis of fats with glycerol are also useful in the present invention as a means of controlling the rate of release of the flavoring agent from the finished artificial spice particle. Such a mixture is also useful as a processing aid in the preparation of the artificial spice particles by (1) preventing the sticking of the mass to the mixing blades and (2) acting as an emulsifying agent by aiding in the dispersion of the flavoring agent in the gelatinized mass.

Monoglycerides are glycerol esters of fatty acids in which only one acid group is attached to the glycerol group. Small amounts of monoglycerides occur naturally. Monoglycerides can be produced synthetically by the alcoholysis of fats with glycerol, yielding a mixture of mono-, di-, and triglycerides. Such a mixture contains predominately monoglycerides. Monoglycerides other than glycerol monolaurate are preferred in the present invention because of a slight soap-like taste exhibited by this compound upon hydrolysis.

Diglycerides are glycerol esters of fatty acids in which two acid groups are attached to a glycerol group. Diglycerides other than glycerol dilaurate are preferred because of a slight soap-like taste exhibited by this compound upon hydrolysis.

In general, only those mixtures of edible mono- and diglycerides that are approved for use in foods are used in the present invention. Such mixtures are commonly used in the food trade and are commercially available.

It is within the scope of the present invention to include flavor enhancers (i.e., water soluble flavoring materials) in the mixture of gelatinized cereal solids and water. For example, in the present invention, up to about 10 per cent by weight salt (sodium chloride) may be added to the gelatinized cereal solid-water mixture. Unlike the water immiscible flavoring agents of the present invention, the water soluble and water miscible flavoring materials will not be contained within discrete cells of the spice particle matrix, but rather will be dispersed throughout the gelatin-like mass.

In addition to the gelatinized cereal solids, other carrier materials such as corn starch and gum acacia may be used. These additional carrier materials have binding characteristics which are different from the gelatinized cereal solids because of their differing solubilities in water. This difference in binding characteristics is manifested in different rates of flavor and color release.

Another typical embodiment of this invention comprises admixing (a) gelatinized cereal solids which when heated in water have binding characteristics but not complete solubility, (b) corn starch, (c) flavoring agents, (d) coloring agents, (e) mixture of edible mono- and diglycerides of higher fatty acids (as a processing aid), (f) gum acacia, and (g) water (to dissolve the gum acacia and to permit swelling of the gelatinized cereal solids).

In this embodiment of the present invention, the artificial spice particle is formed by processing as heretofore described 25 to 50 per cent by weight (preferably 25 to 35 per cent by weight) gelatinized cereal solids, 10 to 35 per cent by weight (preferably 15 to 25 per cent by weight) corn starch, 1 to 7 per cent by weight (preferably 2 to 6 per cent by weight) flavoring agents, 0 to 6 per cent by weight (preferably 0.75 to 3 per cent by weight) coloring agents, 0.5 to 4 per cent by weight (preferably 1 to 2.5 per cent by weight) mixture of edible mono- and diglycerides of higher fatty acids, 10 to 30 per cent by weight (preferably 15 to 25 per cent by weight) gum acacia, and 20 to 35 per cent by weight (preferably 20 to 30 per cent by weight) water.

An especially preferred embodiment of this invention comprises admixing (a) gelatinized cereal solids which when heated in water have binding characteristics but not complete solubility, (b) modified dextrins which have excellent film-forming and binding characteristics and which are very soluble alone but when combined in an artificial spice particle enable one to control the rate of hydration, (c) flavoring agents, (d) coloring agents, (e) mixture of edible mono- and diglycerides of higher fatty acids (as a processing aid), and (f) water to dissolve the modified dextrins and to permit swelling of the gelatinized cereal solids. When the coloring agent is toasted cereal solids, it serves both as coloring agent and as flavor release controller as mentioned hereinabove.

In this embodiment of the present invention, the artificial spice particle is formed by processing as heretofore described 30 to 70 per cent by weight (preferably 35 to 55 per cent by weight) gelatinized cereal solids, 5 to 12 per cent by weight (preferably 6 to 10 per cent by weight) modified dextrins, 4 to 10 per cent by weight (preferably 5 to 8 per cent by weight) flavoring agent, 0 to 15 per cent by weight (preferably 4 to 7 per cent by weight) coloring agent, 1 to 4 per cent by weight (preferably 2 to 3 per cent by weight) mixture of edible mono- and diglycerides of higher fatty acids, and 20 to 45 per cent by weight (preferably 25 to 40 per cent by weight) water.

As hereinbefore indicated, the spice-like particles of the present invention are useful as more sanitary replacements for natural spices. The spice granules as herein described are free-flowing, have the aesthetic appeal of natural whole or ground spices without the attendant hazards of high microbiological contamination, have controlled color and flavor release characteristics, have precisely controlled flavor values and strengths, and will retain the aesthetic appeal of natural whole or ground spices in the consumer food product. By "controlled flavor release" is meant the gradual release of flavoring agents over an extended period of time at temperatures up to the boiling point of water.

The artificial spice particles of the present invention exhibit an unusually low bacteria count when compared with natural whole or ground spices. More specifically, a bacteria count (standard plate count) of about 600 to 2000 is commonly present as determined by standard Food and Drug Administration methods.

The following Table illustrates the drastic differences in contamination hazards between natural spices and the artificial spice particles of the present invention. In this Table, (A) stands for the number of samples analyzed and (B) stands for the mean value of all samples with respect to standard plate count.

TABLE

| Spice | Standard Plate Count Natural | | Artificial Spice Particle | |
|---|---|---|---|---|
| | (A) | (B) | (A) | (B) |
| Black Pepper | 12 | 32,583,000 | 1 | 1200 |
| Celery Seed | 10 | 150,000 | 1 | 1300 |
| Nutmeg | 10 | 7,500 | 1 | 600 |
| Ginger | 6 | 2,750,000 | 1 | 1500 |

The following Examples are given as specific illustrations of the invention. It should be understood, however, that the invention is not limited to the specific details set forth in the Examples.

The spice particles prepared in each of the following Examples generally correspond to those illustrated in the Drawing. The Drawing illustrates the artificial spice particle 1 comprising discrete pockets 2 of flavor cells entrapped within a hardened gelled structure 3. The irregularly shaped chunks 4 within the particle comprise the insoluble farinaceous mass of ungelatinized cereal solid.

EXAMPLE I

An artificial spice particle is prepared by admixing with a high shear mixer 8 parts by weight modified dextrins, 52 parts by weight gelatinized cereal solids derived from corn, and 30 parts by weight water in a vessel. The gelatinized cereal solids used in this and the following Examples are commercially available from the Illinois Cereal Mills as "Cerefluff" gelatinized cereal solids. The above mixture is heated to a temperature of 80°C. and maintained at that temperature until gelation takes place and a water content of 15 parts by weight is achieved. The temperature is lowered to 50°C. and 10 parts by weight oleoresin black pepper is added and thoroughly dispersed with a high shear mixer.

After cooling in trays the mass is ground using a Fitzpatrick Triturating Machine manufactured by the W. J. Fitzpatrick Company. The final moisture level content of the artificial spice particle is 3 parts by weight. The bacteria count of the final artificial spice particle is about 1200.

EXAMPLE II

An artificial spice particle is prepared by admixing with a high shear mixer 8 parts by weight modified dextrins, 52 parts by weight gelatinized cereal solids derived from corn, and 30 parts by weight water in a vessel. The mixture is heated to a temperature of 80°C. and maintained at that temperature until gelation takes place and a water content of 15 parts by weight is achieved. The temperature is lowered to 52°C. and 10 parts by weight oleoresin black pepper is added and thoroughly dispersed with a high shear mixer.

Before hardening, the mass is extruded at a temperature of 48°C. through a heated screw type extruder containing 500 apertures of 2 millimeters diameter. The mass is extruded into a moulding starch where the filaments are cooled until hardening occurs. The filaments are then broken into lengths of about 2 millimeters and separated from the starch before packaging. The final moisture content of the artificial spice particles is 5 parts by weight. The bacteria count of the final artificial spice particles is about 1200.

EXAMPLE III

An artificial spice particle is prepared by admixing with a high shear mixer 22 parts by weight corn starch, 1.5 parts by weight mixture of edible mono- and diglycerides of higher fatty acids, 20 parts by weight gum acacia, 27 parts by weight gelatinized cereal solids derived from corn, and 25.5 parts by weight water in a vessel. The mixture is heated to a temperature of 100°C. under 3 pounds per square inch pressure and maintained at that temperature and pressure until gelation takes place, and a water content of 10 parts by weight is achieved. The temperature is lowered to 50°C. using a vacuum at 3 pounds per square inch pressure and 4 parts by weight oleoresin black pepper is added and thoroughly dispersed with a high shear mixer.

Before hardening, the mass is extruded at a temperature of 55°C. through a heated screw type extruder containing 500 apertures of 2 millimeters diameter. The mass is extruded into a moulding starch where the filaments are cooled until hardening occurs. The filaments are then broken into lengths of about 2 millimeters and separated from the starch before packaging. The final moisture level content of the artificial spice particles is 7 parts by weight. The bacteria count of the final artificial spice particles is about 1200.

The above Examples illustrate the preparation of "Black Pepper" artificial spice particles. However, it should be understood that in these Examples, any flavoring agent or combination of flavoring agents can be used. For example, common levels of other oleoresins and essential oils that can be incorporated into the matrix of the artificial spice particles are as follows:

| Flavoring Agent | Parts by Weight |
| --- | --- |
| Allspice | 5 to 10 |
| Caraway | 4 to 8 |
| Celery | 5 to 10 |
| Cinnamon | 2 to 8 |
| Nutmeg | 8 to 15 |

EXAMPLE IV

An artificial spice particle is prepared by admixing with a high shear mixer 60 parts by weight gelatinized cereal solids derived from corn, 6.5 parts by weight modified dextrins, 5 parts by weight salt, 2 parts by weight mixture of edible mono- and diglycerides of higher fatty acids, and 21 parts by weight water in a vessel. The mixture is heated to a temperature of 80°C. and maintained at that temperature until gelation takes place and a water content of 15 parts by weight is achieved. The temperature is lowered to 50°C. and 5 parts by weight oleoresin paprika and 0.5 parts by weight imitation pizza flavor (mixture of equal parts by weight of oil oreganum, oil onion, oil garlic, and oil basil) are added and thoroughly dispersed with a high shear mixer. The oleoresin paprika has a color value of 40,000 (color value is an indication of color intensity, e.g., redness, of the particular coloring agent).

Before hardening, the mass is extruded at a temperature of 50°C. through a heated screw type extruder containing 500 apertures of 2 millimeters diameter. The mass is extruded into a moulding starch where the filaments are cooled until hardening occurs. The filaments are then broken into lengths of about 2 millimeters and separated from the starch before packaging. The final moisture level content of the artificial spice particles is 5 parts by weight. The bacteria count of the final artificial spice particles is about 1500.

EXAMPLE V

An artificial spice particle is prepared by admixing with a high shear mixer 57 parts by weight gelatinized cereal solids derived from corn, 5 parts by weight modified dextrins, 2.5 parts by weight mixture of edible mono- and diglycerides of higher fatty acids, 5 parts by weight salt, and 25 parts by weight water in a vessel. The mixture is heated to a temperature of 80°C. and maintained at that temperature until gelation takes place and a water content of 15 parts by weight is achieved. The temperature is lowered to 50°C. and 5 parts by weight oleoresin paprika (40,000 color value) and 0.5 parts by weight natural green spice flavor are added and thoroughly dispersed with a high shear mixer. ("Natural green spice flavor" is a product of Norda, Inc. and consists of natural essential oils and flavoring thereby simulating a green vegetable flavor.)

Before hardening, the mass is extruded at a temperature of 50°C. through a heated screw type extruder containing 500 apertures of 2 millimeters diameter. The mass is extruded into a moulding starch where the filaments are cooled until hardening occurs. The filaments are then broken into lengths of about 2 millimeters and separated from the starch before packaging. The final moisture level content of the artificial spice particles is 5 parts by weight. The bacteria count of the final artificial spice particles is about 1350.

EXAMPLE VI

An artificial spice particle is prepared by admixing with a high shear mixer 46.7 parts by weight gelatinized cereal solids derived from corn, 7.8 parts by weight modified dextrins, 2.5 parts by weight mixture of edible mono- and diglycerides of higher fatty acids, 5.7 parts by weight toasted rice bran, and 31.1 parts by weight water in a vessel. The mixture is heated to a temperature of 80°C. and maintained at that temperature until gelation takes place and a water content of 15 parts by weight is achieved. The temperature is lowered to 50°C. and 6.2 parts by weight oleoresin black pepper is added and thoroughly dispersed with a high shear mixer.

Before hardening, the mass is extruded at a temperature of 50°C. through a heated screw type extruder containing 500 apertures of 2 millimeters diameter. The mass is extruded into a moulding starch where the filaments are cooled until hardening occurs. The filaments are then broken into lengths of about 2 millimeters and separated from the starch before packaging. The final moisture level content of the artificial spice particles is 5 parts by weight. The bacteria count of the final artificial spice particles is about 1200.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for preparing an improved particulate free-flowing flavoring composition having controlled flavor release characteristics wherein the flavoring agents are incorporated in a matrix comprising:
  a. forming a mixture of partially gelatinized cereal solids in water, said water being in an amount sufficient to form a viscous difficulty flowable mash,
  b. heating said mixture with agitation to a temperature of from about 65° to about 100°C until gelation takes place and a water content of from about 10 to about 20 per cent by weight is achieved,
  c. cooling said mixture to a temperature of from about 40° to about 60°C,
  d. dispersing at least one flavoring agent substantially throughout the cooled mixture while at a temperature of from about 40° to about 60°C,
  e. cooling said resulting mixture until hardening occurs, and
  f. grinding said hardened mixture to desired free-flowing particle size.

2. The process of claim 1 wherein the mixture of partially gelatinized cereal solids and water formed in step (a) additionally includes modified dextrins.

3. The process of claim 2 wherein the mixture of partially gelatinized cereal solids and water formed in step (a) additionally includes a coloring agent.

4. The process of claim 1 wherein the mixture of partially gelatinized cereal solids and water formed in step (a) additionally contains a mixture of edible mono- and diglycerides of higher fatty acids.

5. The process of claim 3 wherein the mixture of partially gelatinized cereal solids and water formed in step (a) contains from about 30 to about 70 per cent by weight partially gelatinized cereal solids, from about 20 to about 40 per cent by weight water, and additionally contains from about 5 to about 10 per cent by weight modified dextrins and from about 0 to about 15 per cent by weight coloring agent and wherein from about 4 to 15 per cent by weight flavoring agent is dispersed as in step (d).

6. The process of claim 5 wherein the flavoring agent is oleoresin black pepper.

7. The process of claim 1 wherein the mixture of partially gelatinized cereal solids and water formed in step (a) contains from about 35 to about 55 per cent by weight partially gelatinized cereal solids, from about 25 to about 40 per cent by weight water, and additionally contains from about 6 to about 10 per cent by weight modified dextrins, from about 2 to about 3 per cent by weight mixture of edible mono- and diglycerides of higher fatty acids, and from about 0 to about 15 per cent by weight coloring agent.

8. The process of claim 7 wherein the coloring agent consists essentially of from about 4 to about 6 per cent by weight toasted defatted rice bran.

9. The process of claim 6 wherein the flavoring agent containing mixture is extruded before hardening through apertures of from about 2 to about 5 millimeters in diameter into a moulding starch such that the resulting filaments are hardened through cooling, said filaments are broken into lengths of from about 2 to about 5 millimeters, and thereafter said moulding starch is removed.

10. The process of claim 1 wherein the mixture of partially gelatinized cereal solids and water formed in step (a) contains from about 50 to about 75 per cent by weight partially gelatinized cereal solids, from about 20 to about 45 per cent by weight water, and additionally contains from about 5 to about 7 per cent by weight modified dextrins, from about 1.5 to about 2.5 per cent by weight mixture of edible mono- and diglycerides of higher fatty acids, from about 4 to about 6 per cent by weight salt and wherein from about 4 to about 7 per cent by weight flavoring agent is dispersed as in step (d).

11. The process of claim 10 wherein the flavoring agent is a mixture of from about 0.3 to about 0.5 per cent by weight of natural green spice flavor and from about 4 to about 6 per cent by weight oleoresin paprika.

12. The process of claim 4 wherein the mixture of partially gelatinized cereal solids, mono- and diglycerides of higher fatty acids, and water formed in step (a) additionally contains corn starch and gum acacia.

13. The process of claim 12 wherein the mixture of partially gelatinized cereal solids and water formed in step (a) contains from about 25 to about 35 per cent by weight partially gelatinized cereal solids, from about 20 to about 30 per cent by weight water, and additionally contains from about 15 to about 25 per cent by weight corn starch, from about 15 to about 25 per cent by weight gum acacia, from about 1 to about 2.5 per cent by weight mixture of edible mono- and diglycerides of higher fatty acids, from about 0 to about 3 per cent by weight coloring agent, and wherein from about 2 to about 6 per cent by weight flavoring agent is dispersed as in step (d).

14. The process of claim 2 wherein the mixture of partially gelatinized cereal solids, modified dextrins, and water formed in step (a) additionally contains a mixture of edible mono- and diglycerides of higher fatty acids.

15. The process of claim 14 wherein the flavoring agent consists essentially of imitation pizza flavor and oleoresin black pepper.

16. The process of claim 15 wherein the mixture of partially gelatinized cereal solids and water formed in step (a) additionally contains salt.

17. The process of claim 16 wherein the mixture of partially gelatinized cereal solids and water formed in step (a) contains from about 50 to about 70 per cent by weight partially gelatinized cereal solids, from about 20 to about 45 per cent by weight water, and additionally contains from about 5 to about 7 per cent by weight modified dextrins, from about 1.5 to about 2.5 per cent by weight mixture of edible mono- and diglycerides of higher fatty acids, from about 4 to about 6 per cent by weight salt, from about 0 to about 15 per cent by weight coloring agent, and wherein from about 4 to about 6 per cent by weight oleoresin black pepper and from about 0.3 to about 0.5 per cent by weight imitation pizza flavor is dispersed as in step (d).

18. A process for preparing an improved particulate free-flowing flavoring composition having controlled flavor release characteristics wherein flavoring materials are incorporated in a matrix, comprising:
  a. forming a mixture of from about 35 to about 55 per cent by weight partially gelatinized cereal solids, from about 6 to about 10 per cent by weight modified dextrins, from about 2 to about 3 per cent by weight mixture of edible mono- and diglycerides of higher fatty acids, from about 4 to about 8 per cent by weight coloring agent, and from about 25 to about 40 per cent by weight water,
  b. heating said mixture with agitation to a temperature of from about 65° to about 100°C. until gelation takes place and a water content of from about 10 to about 20 per cent by weight is achieved,
  c. cooling said mixture to a temperature of from about 40° to about 60°C.,
  d. dispersing from about 5 to about 8 per cent by weight of at least one water-immiscible flavoring agent substantially throughout the cooled mixture while at a temperature of from about 40° to about 60°C.,
  e. cooling said resulting mixture until hardening occurs, and
  f. grinding said hardened mixture to desired free-flowing particle size.

19. The process of claim 18 wherein the flavoring agent is oleoresin black pepper and wherein the coloring agent consists essentially of toasted defatted rice bran.

20. An improved particulate free-flowing flavoring composition having controlled flavor release characteristics comprising a flavoring agent incorporated in discrete cells substantially dispersed throughout the gelatinized portion of a matrix comprising partially gelatinized cereal solids and water.

21. The improved particulate free-flowing flavoring composition of claim 20 wherein the matrix additionally contains modified dextrins.

22. The improved particulate free-flowing flavoring composition of claim 21 wherein the matrix additionally contains at least one coloring agent.

23. The improved particulate free-flowing flavoring composition of claim 22 wherein from about 4 to about 15 parts by weight flavoring agent is incorporated into a matrix containing from about 30 to about 70 parts by weight partially gelatinized cereal solids, from about 5 to about 10 parts by weight modified dextrins, from about 0 to about 15 parts by weight coloring agents, and from about 3 to about 10 per cent by weight water based upon the total weight of the composition.

24. The improved particulate free-flowing flavoring composition of claim 23 wherein the flavoring agent is oleoresin black pepper.

25. The improved particulate free-flowing flavoring composition of claim 20 wherein the matrix additionally contains a coloring agent and a mixture of edible mono- and diglycerides of higher fatty acids.

26. The improved particulate free-flowing flavoring composition of claim 25 wherein the matrix additionally contains corn starch and gum acacia.

27. The improved particulate free-flowing flavoring composition of claim 26 wherein from about 2 to about 6 parts by weight flavoring agent is incorporated into a matrix containing from about 25 to about 35 parts by weight partially gelatinized cereal solids, from about 15 to about 25 parts by weight corn starch, from about 15 to about 25 parts by weight gum acacia, from about 1 to about 2.5 parts by weight mixture of edible mono- and diglycerides of higher fatty acids, from about 0 to about 3 parts by weight coloring agent, and from about 3 to about 10 per cent by weight water based upon the total weight of the composition.

28. The improved particulate free-flowing flavoring composition of claim 22 wherein the matrix additionally contains a mixture of edible mono- and diglycerides of higher fatty acids.

29. The improved particulate free-flowing flavoring composition of claim 28 wherein from about 4 to about 10 parts by weight flavoring agent is incorporated into a matrix containing from about 50 to about 70 parts by weight partially gelatinized cereal solids, from about 5 to about 7 parts by weight modified dextrins, from about 1.5 to about 2.5 parts by weight mixture of edible mono- and diglycerides of higher fatty acids, from about 0 to about 15 parts by weight coloring agent, and from about 3 to about 10 per cent by weight water based upon the total weight of the composition.

30. The improved particulate free-flowing flavoring composition of claim 29 wherein the matrix additionally contains from about 4 to about 6 parts by weight salt.

31. The improved particulate free-flowing flavoring composition of claim 30 wherein the flavoring agent consists essentially of a mixture of from about 4 to about 6 parts by weight oleoresin paprika and from about 0.3 to about 0.5 parts by weight imitation pizza flavor.

32. The improved particulate free-flowing flavoring composition of claim 22 wherein the matrix contains from about 0 to about 15 parts by weight coloring agent.

33. The improved particulate free-flowing flavoring composition of claim 30 wherein the flavoring agent consists essentially of a mixture of from about 4 to about 6 parts by weight oleoresin paprika and from about 0.3 to about 0.5 parts by weight natural green spice flavor.

34. The improved particulate free-flowing flavoring composition of claim 28 wherein from about 5 to about 8 parts by weight flavoring agent is incorporated into a matrix containing from about 35 to about 55 parts by weight partially gelatinized cereal solids, from about 6 to about 10 parts by weight modified dextrins, from about 2 to about 3 parts by weight mixture of edible mono- and diglycerides of higher fatty acids, from about 0 to about 15 parts by weight coloring agent, and from about 3 to about 10 per cent by weight water.

35. The improved particulate free-flowing flavoring composition of claim 34 wherein the flavoring agent consists of oleoresin black pepper.

36. The improved particulate free-flowing flavoring composition of claim 35 wherein the coloring agent consists essentially of from about 4 to about 6 parts by weight toasted defatted rice bran.

37. An improved particulate free-flowing flavoring composition having controlled flavor release characteristics comprising from about 5 to about 8 parts by weight oleoresin black pepper incorporated in discrete cells substantially dispersed throughout the gelatinized portion of a matrix comprising from about 35 to about 55 parts by weight partially gelatinized cereal solids, from about 6 to about 10 parts by weight modified dextrins, from about 2 to about 3 parts by weight mixture of edible mono- and diglycerides of higher fatty acids, from about 0 to about 15 parts by weight coloring agent, and from about 3 to about 10 percent by weight water.

38. The improved particulate free-flowing flavoring composition of claim 23 wherein the bacteria count of the artificial spice particle is from about 600 to about 2000.

* * * * *